(12) United States Patent
Schirado

(10) Patent No.: US 7,828,119 B1
(45) Date of Patent: Nov. 9, 2010

(54) GREASE GUN APPLICATOR SYSTEM

(76) Inventor: Richard M. Schirado, 6275 31st St., Glen Ullin, ND (US) 58631

( * ) Notice: Subject to any disclaimer, the term of this patent is extended or adjusted under 35 U.S.C. 154(b) by 1176 days.

(21) Appl. No.: 11/332,072

(22) Filed: Jan. 13, 2006

(51) Int. Cl.
*F01M 11/04* (2006.01)
*B67D 7/84* (2010.01)

(52) U.S. Cl. .................... 184/105.2; 222/175; 222/256; 222/333; 222/529

(58) Field of Classification Search ............. 184/105.2, 184/26, 27.1, 31, 32; 222/256, 333, 527, 222/529, 175; 24/298, 300–302; 224/600, 224/603, 257
See application file for complete search history.

(56) References Cited

U.S. PATENT DOCUMENTS

| | | | |
|---|---|---|---|
| 1,871,400 A | 8/1932 | Albertine | |
| 1,939,943 A | 12/1933 | Barks | 221/47.3 |
| 1,949,761 A | 3/1934 | Rea | 221/47.4 |
| 1,965,038 A | 7/1934 | Hartman | 121/164 |
| 2,102,025 A | 12/1937 | Pelouch | 221/47.3 |
| 2,409,619 A | 10/1946 | Fitch | 222/256 |
| 2,505,839 A | 5/1950 | Scovell | 222/262 |
| 2,684,787 A * | 7/1954 | Charpiat | 222/175 |
| 3,987,869 A * | 10/1976 | Bowers | 184/105.1 |
| 4,210,181 A * | 7/1980 | Clevenger | 141/392 |
| 4,257,540 A | 3/1981 | Wegmann et al. | 222/262 |
| 4,334,560 A * | 6/1982 | Lockwood | 141/392 |
| 4,662,551 A * | 5/1987 | Dudley et al. | 224/633 |
| 4,826,050 A | 5/1989 | Murphy et al. | 222/175 |
| 5,067,591 A | 11/1991 | Fehlig | 184/55.1 |
| 5,105,912 A | 4/1992 | Heister | 184/105.2 |
| 5,199,614 A | 4/1993 | Husman | 222/256 |
| 5,224,625 A | 7/1993 | Holtier | 222/1 |
| 5,443,211 A * | 8/1995 | Young et al. | 239/146 |
| 5,595,325 A * | 1/1997 | Leres | 222/135 |
| 5,779,105 A | 7/1998 | Brown et al. | 222/262 |
| 5,829,552 A * | 11/1998 | Fortunato | 184/3.1 |
| D409,059 S | 5/1999 | Wilson et al. | D8/14.1 |
| 5,924,602 A | 7/1999 | Brown et al. | 222/262 |
| D427,864 S | 7/2000 | Kowalchik et al. | D8/14.1 |
| 6,122,966 A * | 9/2000 | Goodman et al. | 73/593 |
| 6,135,327 A | 10/2000 | Post et al. | 222/333 |
| 6,218,980 B1 | 4/2001 | Goebel et al. | 342/64 |
| 6,354,816 B1 | 3/2002 | Yang | 417/411 |
| 6,494,347 B1 | 12/2002 | Yeh | 222/262 |
| 6,568,610 B1 * | 5/2003 | Ericksen | 239/588 |
| 6,736,292 B2 | 5/2004 | Grach et al. | 222/262 |
| 6,923,348 B2 | 8/2005 | Grach et al. | 222/262 |
| 7,004,357 B2 * | 2/2006 | Shew | 222/256 |

(Continued)

FOREIGN PATENT DOCUMENTS

DE      4244337      12/1992

*Primary Examiner*—Bradley T King
*Assistant Examiner*—Thomas Irvin
(74) *Attorney, Agent, or Firm*—Neustel Law Offices

(57) ABSTRACT

A grease gun applicator system for making it easier to use a battery powered grease gun by freeing up one hand while greasing. The grease gun applicator system includes a powered grease gun, a dispensing hose extending from the powered grease gun, a dispensing nozzle attached to a distal end of the dispensing hose and a control switch attached to or adjacent to the dispensing nozzle to control the powered grease gun. A sling is preferably attached to the powered grease gun for allowing easy transportation of the powered grease gun.

14 Claims, 8 Drawing Sheets

U.S. PATENT DOCUMENTS

| | | | | |
|---|---|---|---|---|
| D523,303 S | * | 6/2006 | Amin | D8/14.1 |
| 2002/0070137 A1 | * | 6/2002 | Hedges | 206/373 |
| 2003/0006294 A1 | * | 1/2003 | Frye-Hammelmann et al. | 239/67 |
| 2005/0082389 A1 | * | 4/2005 | Sanchez et al. | 239/332 |
| 2005/0191183 A1 | * | 9/2005 | Kawakami et al. | 417/34 |
| 2005/0230429 A1 | | 10/2005 | Weems et al. | 222/383.1 |
| 2010/0071998 A1 | * | 3/2010 | Cerveny | 184/29 |

\* cited by examiner

GREASE GUN APPLICATOR SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to grease guns and more specifically it relates to a grease gun applicator system for making it easier to use a battery powered grease gun by freeing up one hand while greasing.

2. Description of the Related Art

Any discussion of the prior art throughout the specification should in no way be considered as an admission that such prior art is widely known or forms part of common general knowledge in the field.

Grease guns have been in use for years. Typically, manual powered grease guns must be pumped with one hand and the hose must be directed with the other hand onto the area that is to be greased. Battery powered grease guns do not require pumping. Instead a trigger is pressed, while holding the grease gun with one hand, and the hose is directed with the other hand onto the area that is to be greased.

While trying to grease areas that are hard to reach or require difficult balancing, it is often difficult to properly apply grease using a grease gun. This difficulty arises because the user must use both his/her hands to operate the grease gun, which leaves no hands for stabilizing the individual.

While these devices may be suitable for the particular purpose to which they address, they are not as suitable for making it easier to use a battery powered grease gun by freeing up one hand while greasing. When climbing ladders or reaching hard to get to places, a grease gun is very difficult to use. Generally, a hose on a grease gun is not very long, forcing the user to get very close to area needed to be greased. Also, typical grease guns do not allow the user to comfortably reach a hard to get to area while balancing one self with one of their hands.

In these respects, the grease gun applicator system according to the present invention substantially departs from the conventional concepts and designs of the prior art, and in so doing provides an apparatus primarily developed for the purpose of making it easier to use a battery powered grease gun by freeing up one hand while greasing.

BRIEF SUMMARY OF THE INVENTION

In view of the foregoing disadvantages inherent in the known types of grease guns now present in the prior art, the present invention provides a new grease gun applicator system construction wherein the same can be utilized for making it easier to use a battery powered grease gun by freeing up one hand while greasing.

The general purpose of the present invention, which will be described subsequently in greater detail, is to provide a new grease gun applicator system that has many of the advantages of the grease guns mentioned heretofore and many novel features that result in a new grease gun applicator system which is not anticipated, rendered obvious, suggested, or even implied by any of the prior art grease guns, either alone or in any combination thereof.

To attain this, the present invention generally comprises a powered grease gun, a dispensing hose extending from the powered grease gun, a dispensing nozzle attached to a distal end of the dispensing hose and a control switch attached to or adjacent to the dispensing nozzle to control the powered grease gun. A sling is preferably attached to the powered grease gun for allowing easy transportation of the powered grease gun.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a grease gun applicator system that will overcome the shortcomings of the prior art devices.

A second object is to provide a grease gun applicator system for making it easier to use a battery powered grease gun by freeing up one hand while greasing.

Another object is to provide a grease gun applicator system that may be utilized to input grease into difficult to reach grease fittings.

An additional object is to provide a grease gun applicator system that only requires one hand to fully operate.

A further object is to provide a grease gun applicator system that may be utilized with new or existing battery powered grease guns.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
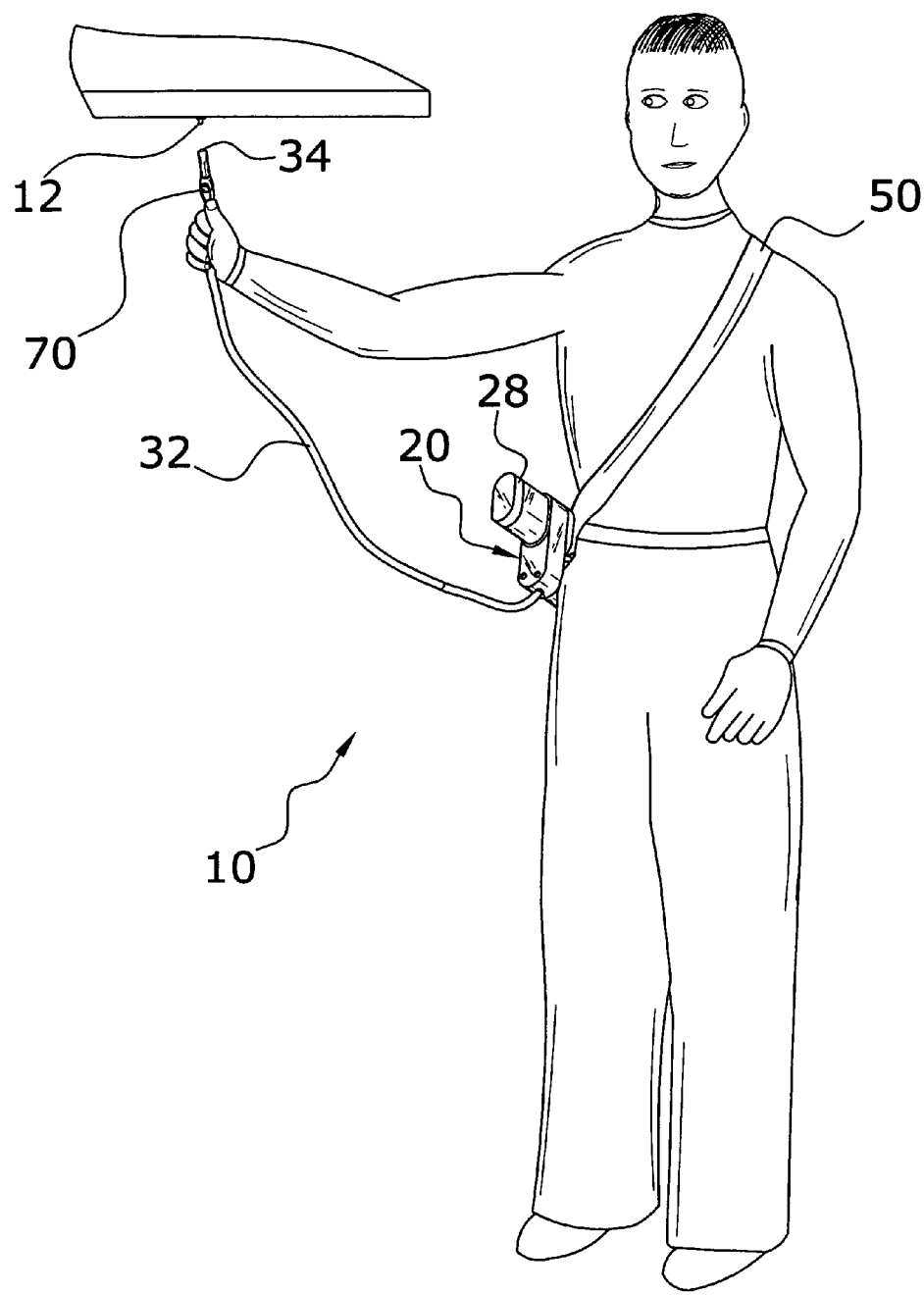
FIG. 1 is an upper perspective view of the present invention in use by a user.

Turning now descriptively to the drawings, in which similar reference characters denote similar elements throughout the several views, FIGS. 1 through 8 illustrate a grease gun applicator system 10, which comprises a powered grease gun 20, a dispensing hose 32 extending from the powered grease gun 20, a dispensing nozzle 34 attached to a distal end of the dispensing hose 32 and a control switch 70 attached to or adjacent to the dispensing nozzle 34 to control the powered grease gun 20.

B. Powered Grease Gun

FIGS. 1 through 5 illustrate an exemplary powered grease gun 20. The powered grease gun 20 may be comprised of any grease gun that is electrically powered by a power source 14 (e.g. battery, wall outlet). The exemplary powered grease gun 20 preferably has a housing 21, a handle 22 extending from the housing 21 (typically a storage location for a battery), and a receiver unit 30 connected to the housing 21. The receiver unit 30 receives a grease cartridge and provides the grease to the pump which is mechanically connected to the motor 26 within the powered grease gun 20. The pump provides pressurized grease to the dispensing hose 32 that is fluidly connected to the pump.

The dispensing hose 32 is comprised of a desirable length and fluidly extends from the powered grease gun 20 for dispensing the pressurized grease. The dispensing hose 32 is preferably comprised of a flexible tubular structure capable of transporting the pressurized grease to a dispensing nozzle 34 attached to the distal end of the dispensing hose 32. The dispensing nozzle 34 is formed to fit upon a grease fitting 12 (referred to commonly as a grease zerk).

Figure 3:
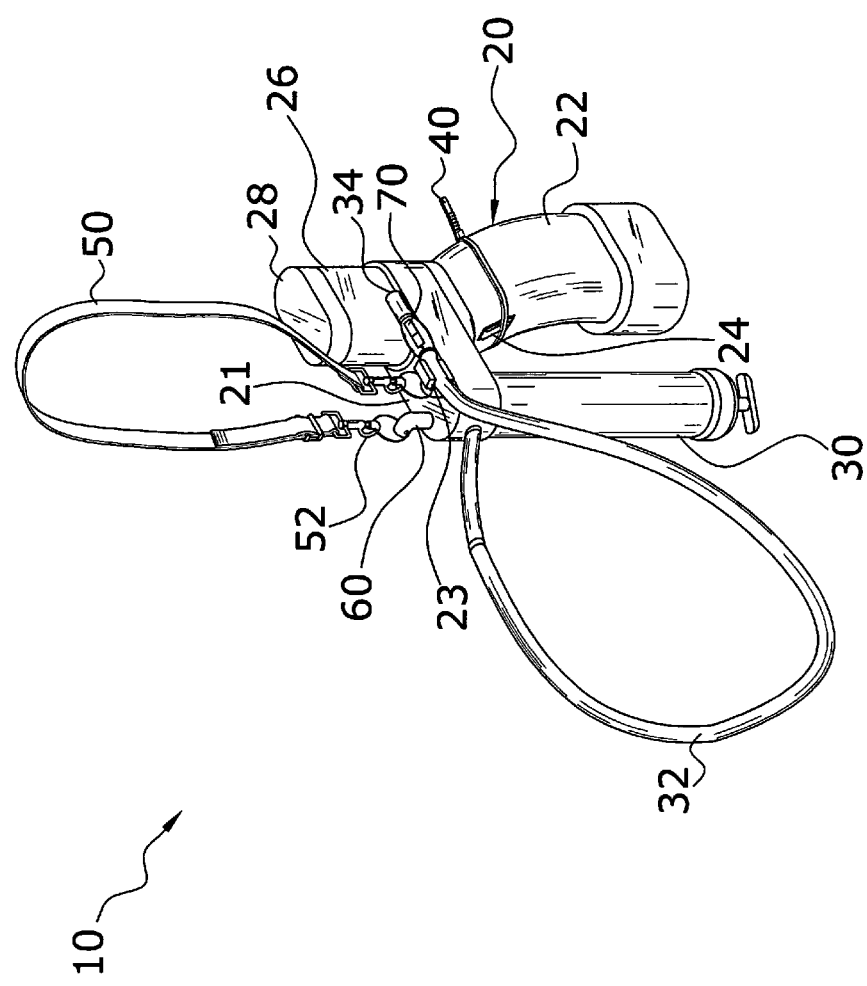
FIG. 3 is an upper perspective view of the present invention with the hose secured within the holder member.
Figure 4:
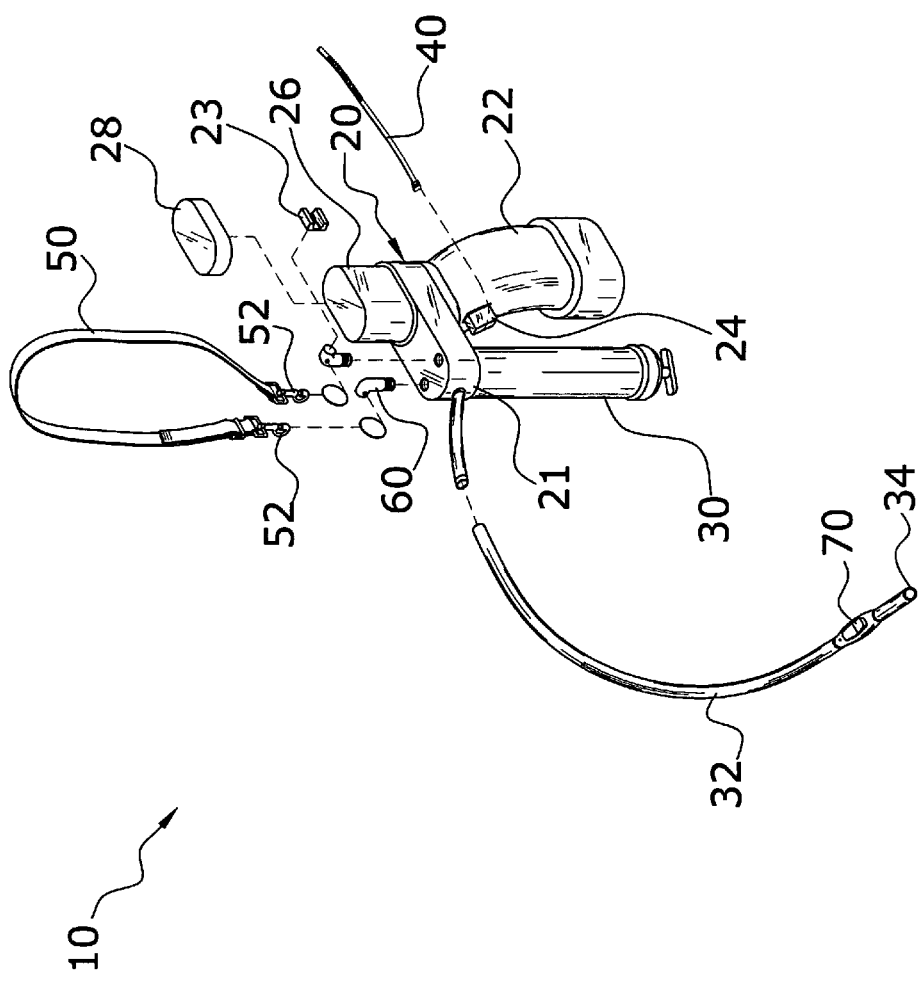
FIG. 4 is an exploded upper perspective view of the present invention.

A holder member 23 is preferably attached to the housing 21 of the powered grease gun 20 for catchably receiving the dispensing hose 32 when not in use as best illustrated in FIG. 3 of the drawings. The holder member 23 is preferably comprised of a clip structure as illustrated in FIG. 4 of the drawings.

As shown in FIGS. 2 through 5 of the drawings, a locking member 40 is provided for surrounding a handle 22 of the powered grease gun 20 and engaging a main switch 24 (e.g. trigger) of the powered grease gun 20 thereby maintaining the main switch 24 in a closed state. The locking member 40 is preferably comprised of a plastic zip tie, however the locking member 40 may be comprised of other structures capable of retaining the main switch 24 in a closed state (e.g. tape).

C. Control Switch

The control switch 70 is attached to or adjacent to the dispensing nozzle 34 so that when the user is retaining the dispensing nozzle 34 upon a grease fitting 12 they may simultaneously close the control switch 70 as shown in FIG. 1 of the drawings. The control switch 70 may be attached to or integrally formed within the dispensing nozzle 34 and/or dispensing hose 32. The control switch 70 is preferably a rocker switch, however other types of switches may be utilized.

The control switch 70 may be electrically connected to the powered grease gun 20 via a control cable 72 that runs the length of the dispensing hose 32 (FIG. 5) or the control switch 70 may include a transmitter 74 for transmitting a signal to a receiver 76 electrically connected to the powered grease gun 20.

Figure 7:
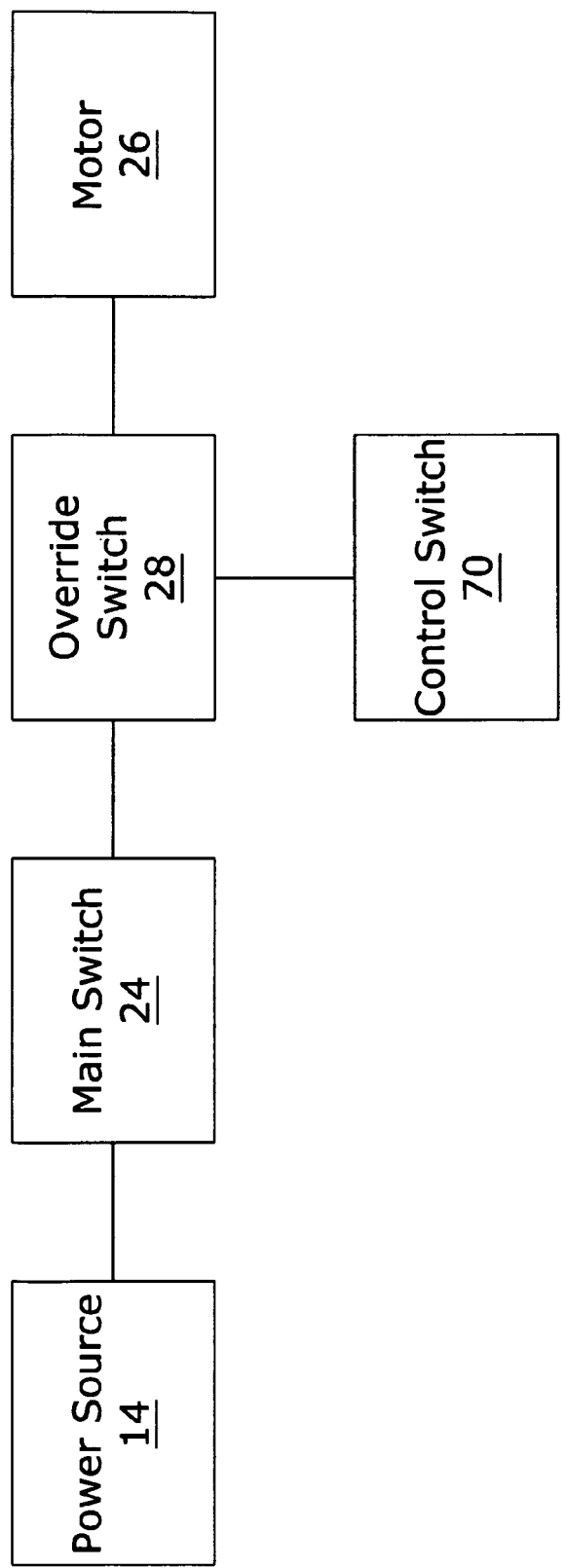
FIG. 7 is a block diagram of the present invention.
Figure 8:
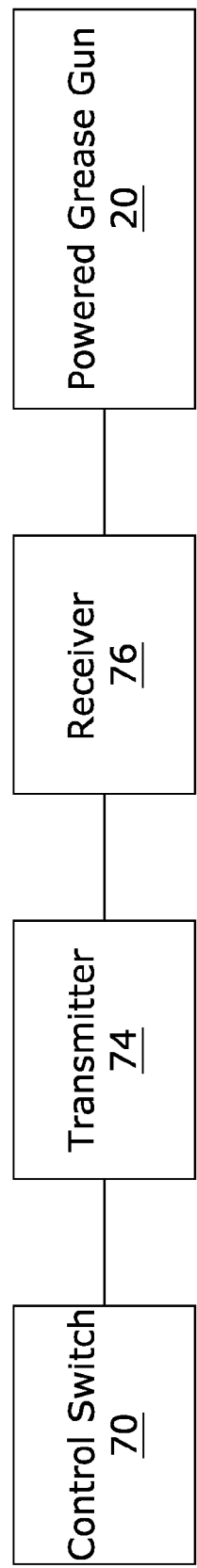
FIG. 8 is a block diagram of the transmitter and receiver connection between the control switch and the powered grease gun.

If the control switch 70 is in communication with the powered grease gun 20 via a radio signal, an override switch 28 is preferably electrically positioned between said motor 26 and said main switch 24 of the powered grease gun 20 as shown in FIG. 7 of the drawings. The override switch 28 is opened and closed based upon the same state of the control switch 70 to allow for remote control of the operation of the powered grease gun 20 by the control switch 70. If a control cable 72 is electrically connected between the control switch 70 and the powered grease gun 20, the control switch 70 is thereby electrically connected between the main switch 24 and the motor 26 via the control cable 72.

D. Sling

An elongated sling 50 is preferably attached to the powered grease gun 20 for supporting the powered grease gun 20 upon the shoulder of the user during use as shown in FIG. 1 of the drawings. The elongated sling 50 is preferably adjustable in length to accommodate various sizes of users.

Figure 2:
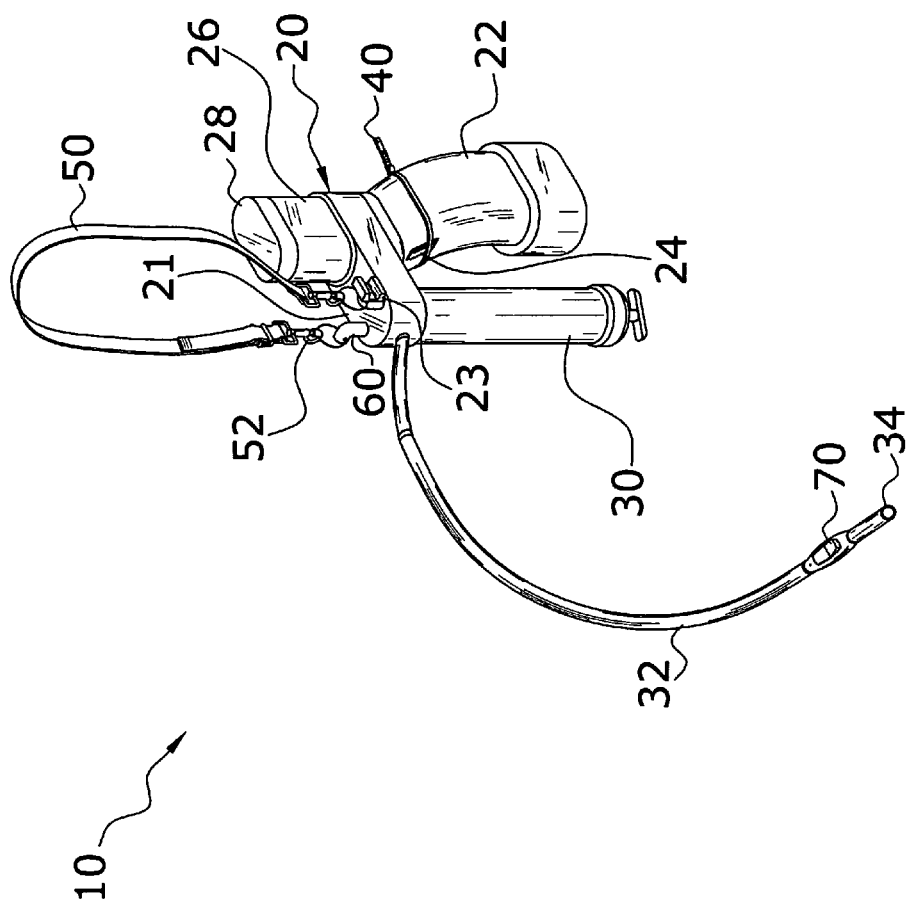
FIG. 2 is an upper perspective view of the present invention.

A pair of connecting members 60 are attached to the powered grease gun 20 and a pair of catch members 52 extend from distal ends of the sling 50 for removably attaching to the pair of connecting members 60 as best shown in FIGS. 2 through 4 of the drawings. The pair of connecting members 60 are preferably threadably attached to threaded openings within the housing 21 of the powered grease gun 20 as best illustrated in FIG. 4 of the drawings.

Figure 5:
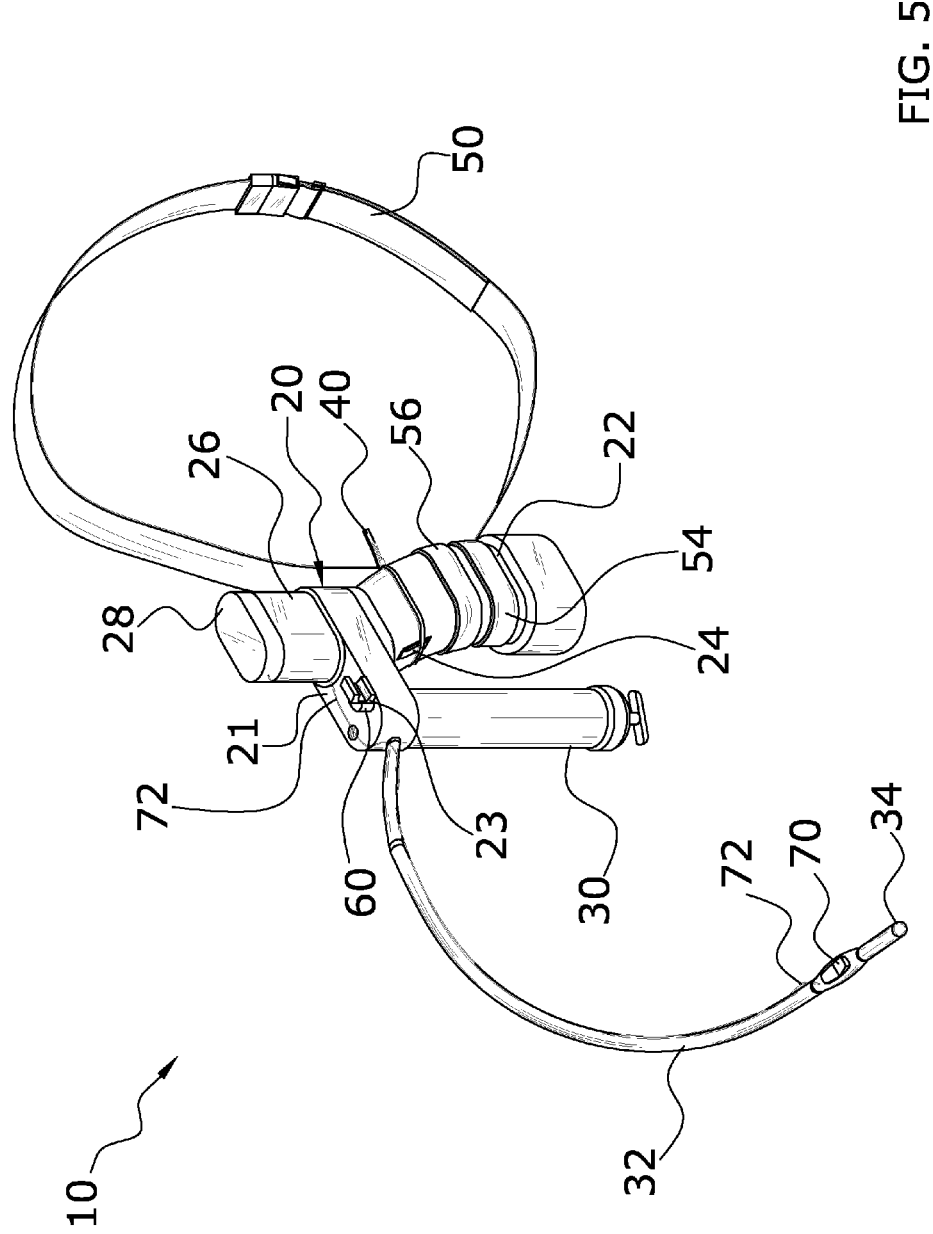
FIG. 5 is an upper perspective view of the present invention illustrating an alternative sling.
Figure 6:
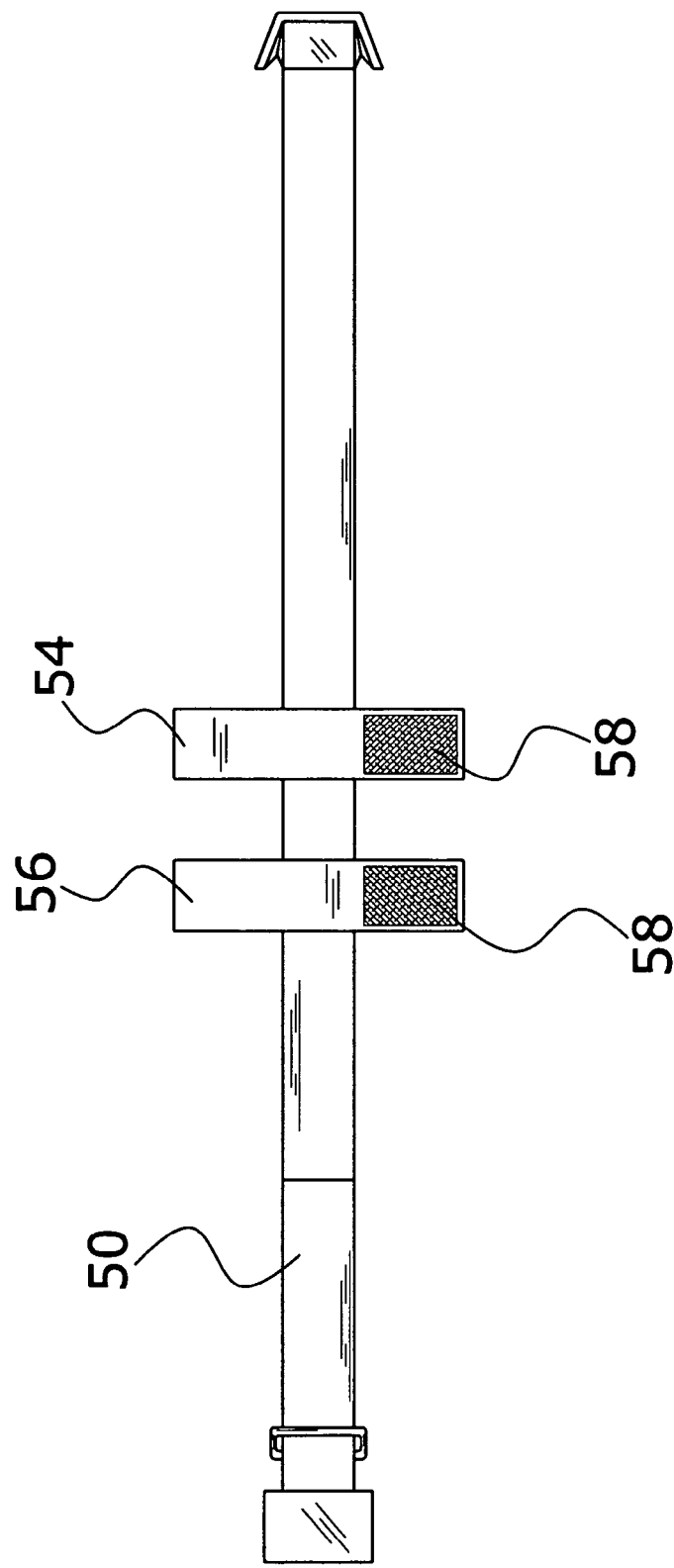
FIG. 6 is a top view of the alternative sling.

Alternative as shown in FIGS. 5 and 6 of the drawings, the sling 50 includes a first strap 54 and a second strap 56 extending substantially transversely with respect to the sling 50. The straps 54, 56 are sufficient in length to surround the handle 22 of the powered grease gun 20 and connect to themselves with fasteners as shown in FIG. 5 of the drawings. The first strap 54 and the second strap 56 each preferably include hook and loop fasteners 58 at their respective distal portions for removably securing about a receiver unit 30 of the powered grease gun 20. The straps 54, 56 are preferably substantially centered upon the sling 50 as further shown in FIG. 6 of the drawings.

E. Operation of Invention

In use, the user straps the sling 50 over their shoulder to easily transport the powered grease gun 20 as shown in FIG. 1 of the drawings. It can be appreciated that the powered grease gun 20 may also be simply laid upon the ground while the user reaches beneath an object for greasing. The user then positions the dispensing nozzle 34 in a fluidly connected manner to the grease fitting 12 on equipment or other object to be greased. With the same hand, the user then manipulates the control switch 70 to activate the motor 26 of the powered grease gun 20 which then dispenses the pressurized grease to the dispensing nozzle 34. The user maintains the control switch 70 in the closed state until the desired amount of grease has been dispensed into the grease fitting 12, after which the user opens the control switch 70 which terminates the motor 26 of the powered grease gun 20. The user then removes the dispensing nozzle 34 and may continue to use the present invention with respect to additional grease fittings 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A grease gun applicator system, comprising:
   a powered grease gun having a motor, a pump, and a main switch, said main switch adapted to activate said pump and said motor to dispense grease from a grease cartridge through a dispensing hose of said powered grease gun, said dispensing hose having a dispensing nozzle at a distal end;
   a control switch attached to said dispensing nozzle, wherein said control switch is in communication with said motor of said powered grease gun to control said powered grease gun; and
   a locking member for surrounding a handle of said powered grease gun and engaging a said main switch of said powered grease gun thereby maintaining said main switch in a closed state, wherein said control switch is adapted to activate and deactivate said motor of said powered grease gun for dispensing grease through said dispensing nozzle when said main switch is in said closed state.

2. The grease gun applicator system of claim 1, including a control cable electrically connecting said control switch and said motor of said powered grease gun.

3. The grease gun applicator system of claim 1, wherein said control switch includes a transmitter for transmitting a signal to a receiver electrically connected to said powered grease gun.

4. The grease gun applicator system of claim 1, including an override switch electrically connected between a said motor and a said main switch of said powered grease gun, wherein said control switch is in communication with and controls said override switch.

5. The grease gun applicator system of claim 1, wherein control switch is comprised of a rocker switch.

6. An auxiliary control system for a powered grease gun, said powered grease gun having a motor, a pump, and a main switch, said main switch adapted to activate said pump and said motor to dispense grease from a grease cartridge through a dispensing hose of said powered grease gun, said dispensing hose having a dispensing nozzle at a distal end, said auxiliary control system comprising:
   an override switch connected to said powered grease gun, said override switch electrically connected between said main switch and said motor of said powered grease gun and adapted to override said main switch; and
   a control switch connected to said dispensing hose adjacent said dispensing nozzle, said control switch electrically connected to said override switch, said control switch adapted to control said override switch to activate said motor and said pump for dispensing grease through said dispensing hose and said dispensing nozzle.

7. The auxiliary control system of claim 6, including a holder member attached to said powered grease gun for catchably receiving said dispensing hose.

8. The auxiliary control system of claim 6, including a locking member for surrounding a handle of said powered grease gun and engaging said main switch of said powered grease gun thereby maintaining said main switch in a closed state.

9. The auxiliary control system of claim 6, including a control cable electrically connecting said control switch and said override switch.

10. The auxiliary control system claim 6, wherein said control switch includes a transmitter for transmitting a signal to a receiver electrically connected to said powered grease gun.

11. The auxiliary control system of claim 6, wherein control switch is comprised of a rocker switch.

12. An auxiliary control system for a powered grease gun, said powered grease gun having a housing, said housing having a motor, a pump, a main switch, a handle, and a power supply, said main switch adapted to activate said pump and said motor to dispense grease from a grease cartridge extending from said housing through a dispensing hose of said powered grease gun extending from said housing, said dispensing hose having a dispensing nozzle at a distal end, said auxiliary control system comprising:
   a locking member surrounding said handle of said powered grease gun and engaging said main switch of said powered grease gun thereby maintaining said main switch in a closed state;
   an override switch connected to said powered grease gun, said override switch electrically connected between said main switch and said motor of said powered grease gun and adapted to override said main switch; and
   a manually operable control switch connected to said dispensing hose adjacent said dispensing nozzle, said control switch not in fluid communication with said dispensing hose and said control switch electrically connected to said override switch;
   wherein said control switch is adapted to activate and deactivate said motor of said powered grease gun via said override switch for dispensing grease through said dispensing nozzle when said main switch is in said closed state.

13. The grease gun applicator system of claim 12, including a control cable electrically connecting said control switch and said override switch.

14. The grease gun applicator system of claim 12, wherein said control switch includes a transmitter for transmitting a signal to a receiver electrically connected to said powered grease gun, said signal adapted to activate and deactivate said motor.

* * * * *